US011938854B2

(12) United States Patent
Iizuka

(10) Patent No.: US 11,938,854 B2
(45) Date of Patent: Mar. 26, 2024

(54) RESIN FOAMED BODY

(71) Applicant: Archem Inc., Tokyo (JP)

(72) Inventor: Makoto Iizuka, Tokyo (JP)

(73) Assignee: Archem Inc., Tokyo (JP)

( * ) Notice: Subject to any disclaimer, the term of this patent is extended or adjusted under 35 U.S.C. 154(b) by 413 days.

(21) Appl. No.: 17/298,668

(22) PCT Filed: Nov. 28, 2019

(86) PCT No.: PCT/JP2019/046666
§ 371 (c)(1),
(2) Date: Jun. 1, 2021

(87) PCT Pub. No.: WO2020/116325
PCT Pub. Date: Jun. 11, 2020

(65) Prior Publication Data
US 2022/0055266 A1     Feb. 24, 2022

(30) Foreign Application Priority Data
Dec. 3, 2018   (JP) .................. 2018-226826

(51) Int. Cl.
*B60N 2/90* (2018.01)
*B29C 44/34* (2006.01)
(Continued)

(52) U.S. Cl.
CPC .............. *B60N 2/90* (2018.02); *B29C 44/355* (2013.01); *B29D 99/0092* (2013.01); *B29K 2075/00* (2013.01); *B29K 2105/045* (2013.01)

(58) Field of Classification Search
None
See application file for complete search history.

(56) References Cited

U.S. PATENT DOCUMENTS

2008/0076844 A1    3/2008  Van Sumeren et al.
2015/0208815 A1*   7/2015  Chandler .............. A47C 7/748
                                              5/421
(Continued)

FOREIGN PATENT DOCUMENTS

EP    3325428 A1    5/2018
GB    1133198 A    11/1968
(Continued)

OTHER PUBLICATIONS

Jul. 21, 2022, search result of Office Action issued by the China National Intellectual Property Administration in the corresponding Chinese Patent Application No. 201980080172.5.
(Continued)

*Primary Examiner* — Chinessa T. Golden
(74) *Attorney, Agent, or Firm* — KENJA IP LAW PC

(57) ABSTRACT

A resin foamed body 1 is a resin foamed body made of flexible resin, the resin foamed body entirely includes a skeleton part 2, the skeleton part includes a plurality of bone parts 2B and a plurality of connection parts 2J connecting end parts of a plurality of bone parts, and an average value AV(A0/A1) of a ratio A0/A1 of cross-sectional area A0 of a bone change part of each bone part at an edge 2B22 on a bone constant part side relative to cross-sectional area A1 of the bone change part at an edge 2B21 on the connection part side satisfies $0.15 \leq AV(A0/A1) < 0.5$.

4 Claims, 14 Drawing Sheets

(51) Int. Cl.
B29D 99/00 (2010.01)
B29K 75/00 (2006.01)
B29K 105/04 (2006.01)

(56) References Cited

U.S. PATENT DOCUMENTS

| | | |
|---|---|---|
| 2016/0017999 A1 | 1/2016 | Boyd et al. |
| 2017/0305093 A1 | 10/2017 | Ziolek |
| 2018/0070736 A1* | 3/2018 | Achten ............... A47C 23/002 |
| 2018/0071979 A1 | 3/2018 | Achten et al. |

FOREIGN PATENT DOCUMENTS

| | | |
|---|---|---|
| JP | H0976332 A | 3/1997 |
| JP | 2000185328 A | 7/2000 |
| JP | 2002065409 A | 3/2002 |
| JP | 2009029064 A | 2/2009 |
| JP | 2016107801 A | 6/2016 |
| JP | 2018528850 A | 10/2018 |
| JP | 2019210448 A | 12/2019 |
| JP | 6633174 B1 | 1/2020 |
| WO | 2017015489 A1 | 1/2017 |
| WO | 2019235546 A1 | 12/2019 |

OTHER PUBLICATIONS

Aug. 26, 2022, search result of the Extended European Search Report issued by the European Patent Office in the corresponding European Patent Application No. 19893299.8.
Feb. 18, 2020, International Search Report issued in the International Patent Application No. PCT/JP2019/046666.
Jun. 8, 2021, International Preliminary Report on Patentability issued in the International Patent Application No. PCT/JP2019/046666.

* cited by examiner

VIEW IN DIRECTION OF ARROW D

VIEW IN DIRECTION OF ARROW D

VIEW IN DIRECTION OF ARROW E

VIEW IN DIRECTION OF ARROW E

RESIN FOAMED BODY

TECHNICAL FIELD

The present disclosure relates to a resin foamed body.

The present application is based on and claims the benefit of priority from the prior Japanese Patent Application No. 2018-226826 filed on Dec. 3, 2018 in Japan; the entire contents of which are incorporated hereby by reference.

BACKGROUND

A seat pad that provides seating comfort improved through density adjustment has been conventionally available as a resin foamed body (for example, PTL 1).

CITATION LIST

Patent Literature

PTL 1: Japanese Patent Laid-Open No. 2002-65409

SUMMARY

Technical Problem

Typically, when a user applies weight to a resin foamed body, an improved sense of being sucked (embraced) (hereinafter referred to as a "sense of touch") can be obtained as the ratio of rigidity in the shear direction (hereinafter referred to as "shearing rigidity") relative to rigidity in the compression direction (hereinafter referred to as "compression rigidity") is smaller in the resin foamed body.

However, the compression rigidity and shearing rigidity of the resin foamed body both change in accordance with change of the density of the resin foamed body when the density is adjusted as in PTL 1. Thus, it has been impossible to sufficiently improve the sense of touch.

The present disclosure is intended to provide a resin foamed body that can provide an improved sense of touch.

Solution to Problem

A resin foamed body of the present disclosure is
a resin foamed body made of flexible resin,
the resin foamed body entirely includes a skeleton part,
the skeleton part includes
  a plurality of bone parts, and
  a plurality of connection parts connecting end parts of the plurality of bone parts,
the plurality of bone parts each include
  a bone constant part extending while keeping cross-sectional area substantially constant, and
  a bone change part extending from the bone constant part to the corresponding connection part while gradually increasing cross-sectional area, and
as for the plurality of bone parts, in each of the plurality of bone parts, an average value AV(A0/A1) of a ratio A0/A1 of cross-sectional area A0 of the bone change part of each bone part at an edge on the bone constant part side relative to cross-sectional area A1 of the bone change part at an edge on the connection part side satisfies $0.15 \leq AV(A0/A1) < 0.5$.

Advantageous Effect

According to the present disclosure, it is possible to provide a resin foamed body that can provide an improved sense of touch.

DETAILED DESCRIPTION

Figure 1:
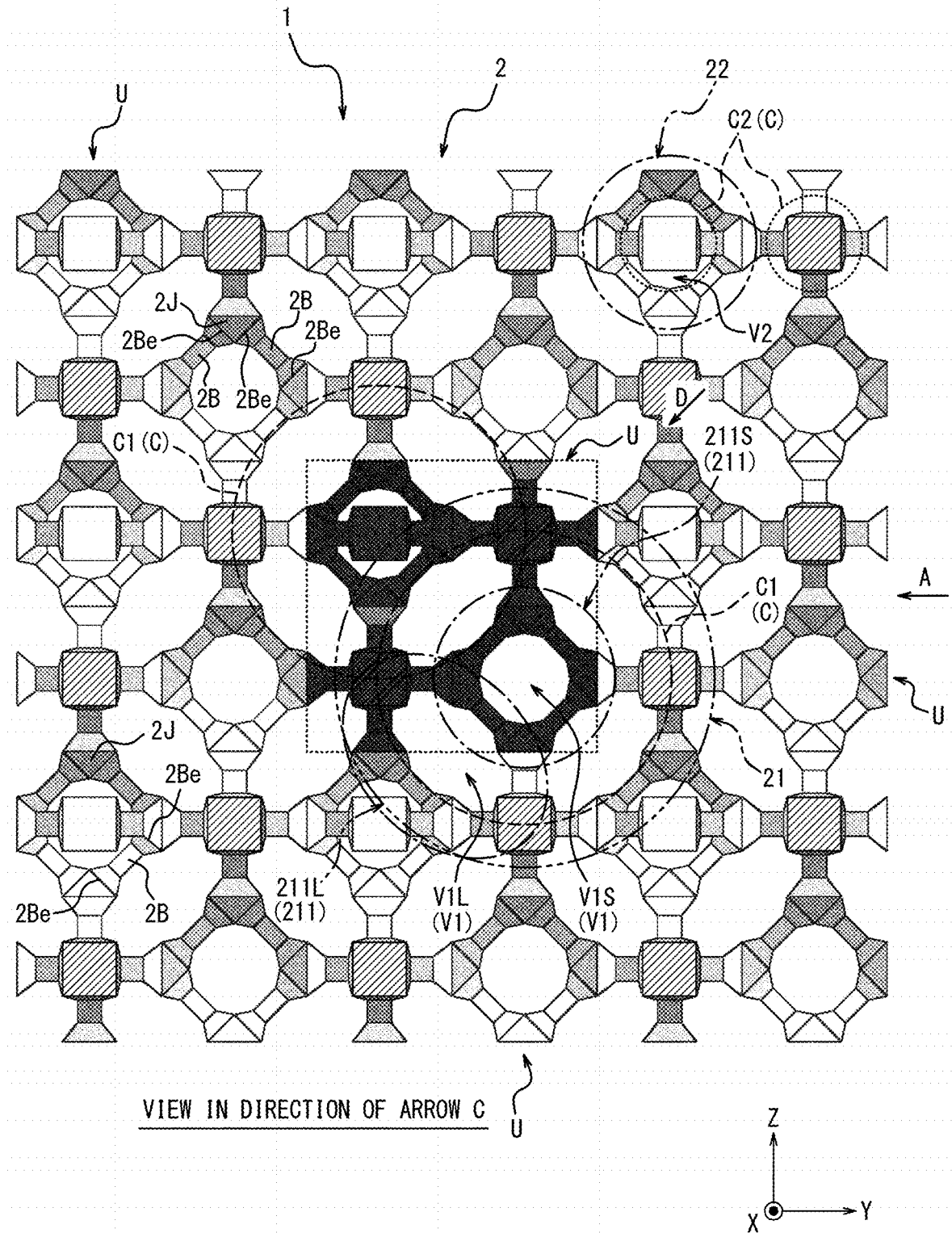
FIG. 1 is a plan view illustrating part of a resin foamed body according to an embodiment of the present disclosure being viewed in the direction of arrow C in FIG. 2.

A resin foamed body of the present disclosure is preferably used for a cushion member, more preferably used for, for example, a seating cushion member (such as a seat pad, particularly, a car seat pad) or a bed.

An embodiment of the resin foamed body according to the present disclosure will be exemplarily described with reference to the accompanying drawings.

Any common component in the drawings is denoted by the same reference sign.

In FIGS. 1 to 6 and 8, the orientation of an XYZ orthogonal coordinate system fixed to a resin foamed body is illustrated to facilitate understanding of the orientation of the resin foamed body.

First, a resin foamed body 1 according to an embodiment of the present disclosure will be described below with reference to FIGS. 1 to 7. FIGS. 1 to 7 schematically illustrate part of the resin foamed body 1 of the present embodiment.

Figure 2:
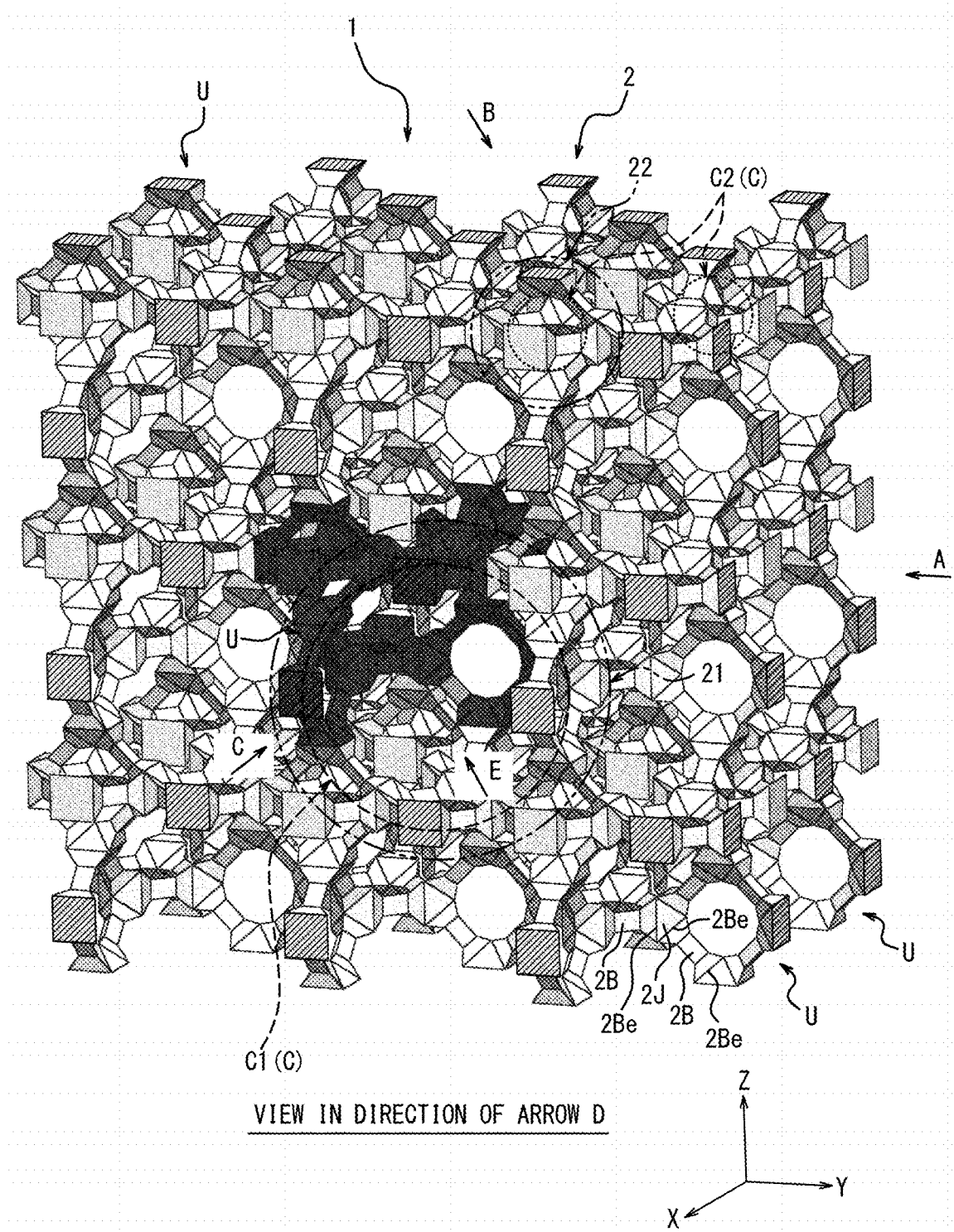
FIG. 2 is a perspective view illustrating the resin foamed body in FIG. 1 being viewed in the direction of arrow D in FIG. 1.

In FIGS. 1 and 2, a part cut into a rectangular parallelepiped in the resin foamed body 1 according to the present embodiment is viewed at different angles, respectively. In FIG. 1, one surface of the part of the resin foamed body 1 is seen in planar view, in other words, the part of the resin foamed body 1 is viewed in the direction (−X direction) of arrow C in FIG. 2. In FIG. 2, a surface of the part of the resin foamed body 1, which is same as that in FIG. 1 is obliquely viewed from above, in other words, the part of the resin foamed body 1 is viewed in the direction of arrow D in FIG. 1.

The resin foamed body 1 is made of flexible resin. More specifically, the resin foamed body 1 includes a skeleton part 2 as a skeleton of the resin foamed body 1, and a large number of cell holes C defined by the skeleton part 2. The skeleton part 2 exists in the entire resin foamed body 1 and made of flexible resin. In the present example, the resin foamed body 1 has an open-cell structure that does not include a film 3 (FIG. 8) by which the cell holes C are separated from each other, and part of the resin foamed body 1 other than the skeleton part 2 is a void space.

The "flexible resin" is resin (including rubber) that can deform when external force is applied, and is preferably, for example, elastomer resin or rubber, more preferably polyurethane. In other words, the resin foamed body 1 is not limited to foamed urethane resin but may be another resin foamed body such as foamed rubber. The resin foamed body 1, which is made of flexible resin, can perform compressing and restoring deformation in accordance with application and cancellation of external force and can have a cushioning characteristic.

In the present embodiment, the resin foamed body 1 is manufactured through the process (foaming process) of foaming by chemical reaction. Specifically, the resin foamed body 1 of the present embodiment is preferably manufactured through, for example, foaming shaping using a mold or slab shaping. The cross-sectional area and length of each component (for example, a bone part 2B to be described later) of the skeleton part 2 of the resin foamed body 1 can be changed by adjusting a foaming agent, internal pressure of a mold, mold temperature, or the like. The open-cell structure of the resin foamed body 1 is formed by, for example, removing the above-described film 3 (FIG. 8) in an open-cell formation process after the foaming process.

However, the resin foamed body 1 may be shaped by a 3D printer.

In FIGS. 1 and 2, part U (hereinafter referred to as "unit part U") of the part of the resin foamed body 1 illustrated in FIGS. 1 and 2 is colored in a dark gray color for convenience, and in FIG. 1, the outer edge (outer outline) of the unit part U is illustrated with a dotted line. In the illustrated example, the outer edge of the unit part U has a rectangular parallelepiped shape, and the resin foamed body 1 has a configuration in which a plurality of unit parts U are integrated in X, Y, and Z directions. The part of the resin foamed body 1 illustrated in FIGS. 1 and 2 is made of 18 unit parts U constituted by three unit parts arrayed in the Z direction, three unit parts arrayed in the Y direction, and two unit parts arrayed in the X direction. In the present example, the configuration, dimension, and orientation of each unit part U included in the resin foamed body 1 are each substantially same. However, the outer edge (outer outline) of each unit part U may have a shape other than a rectangular parallelepiped shape. The configuration and/or dimension may slightly differ among the unit parts U included in the resin foamed body 1.

Figure 3:
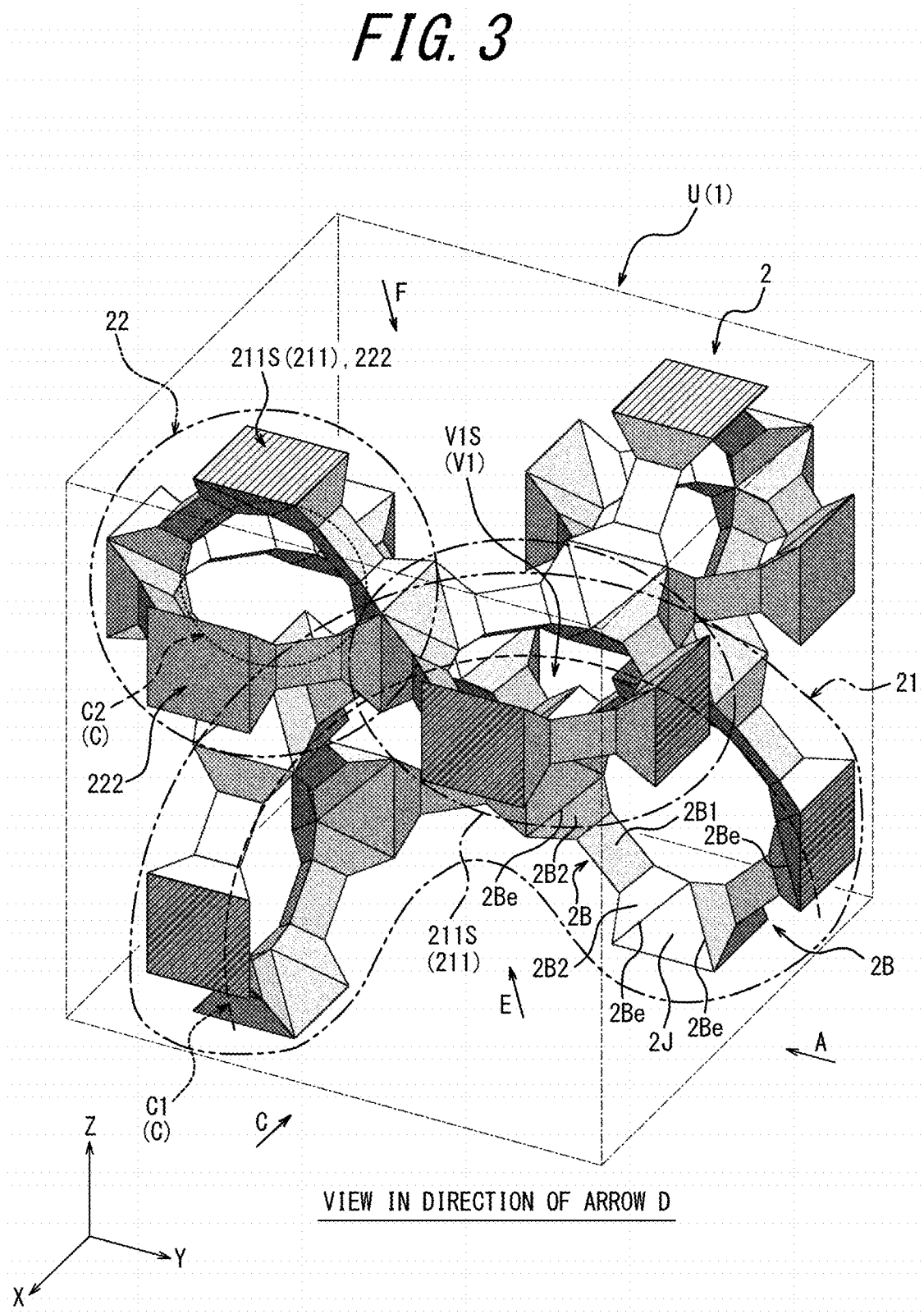
FIG. 3 is a perspective view illustrating a unit part of the resin foamed body in FIG. 1 being viewed in the direction of arrow D in FIG. 1.
Figure 4:
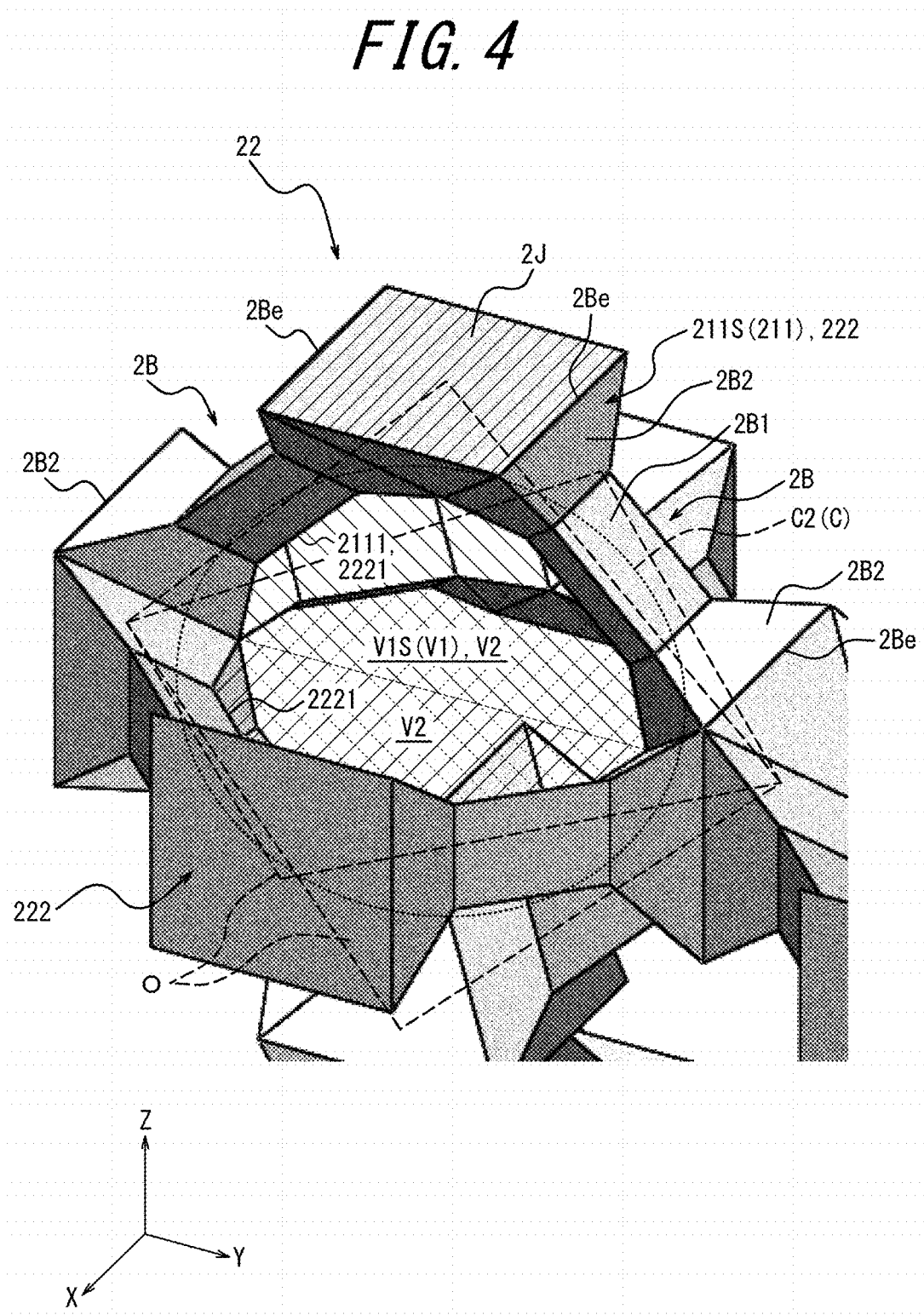
FIG. 4 is a perspective view illustrating part of the unit part of the resin foamed body in FIG. 3 being viewed is an enlarged manner.
Figure 5:
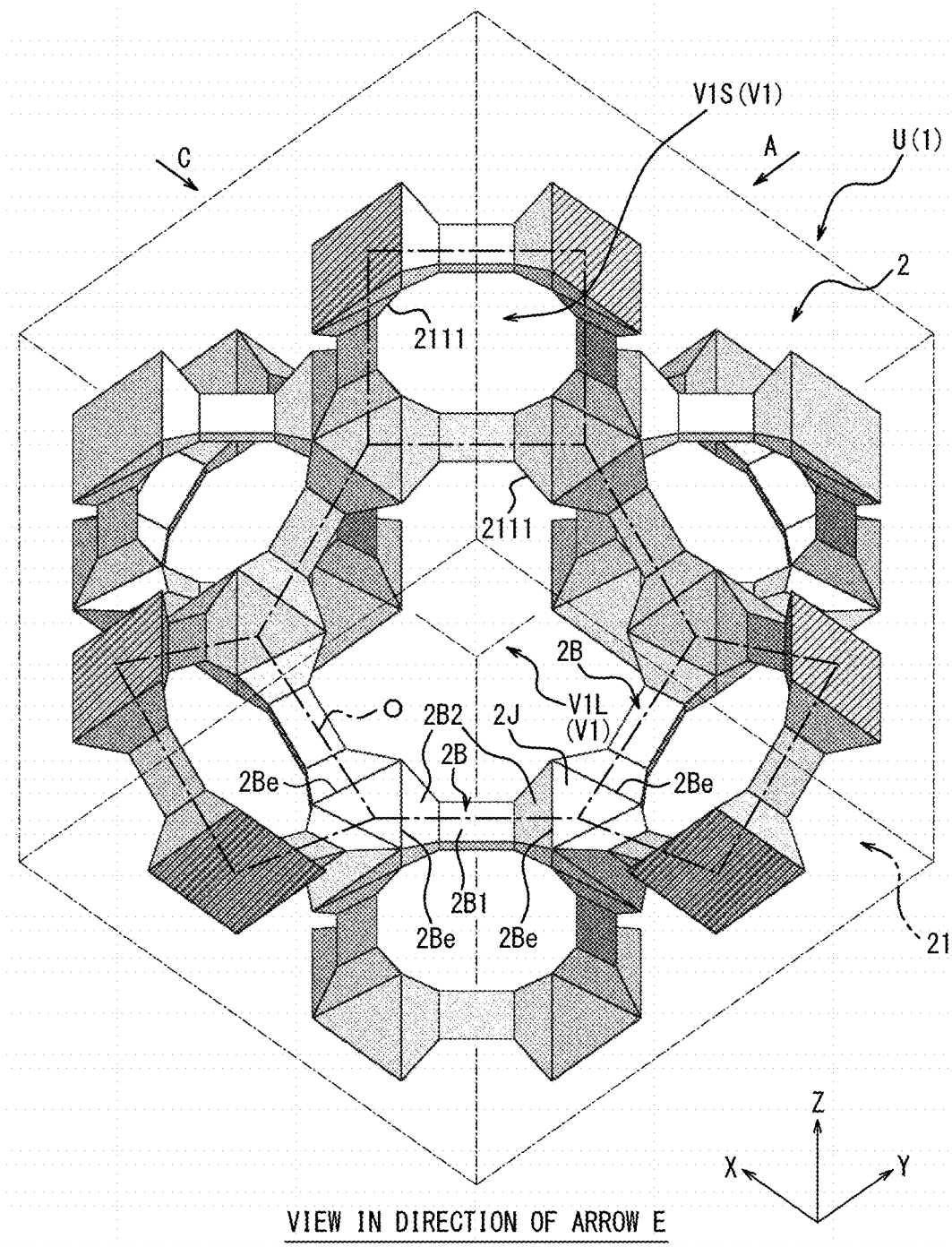
FIG. 5 is a perspective view illustrating the unit part of the resin foamed body in FIG. 3 being viewed in the direction of arrow E in FIG. 3.
Figure 6:
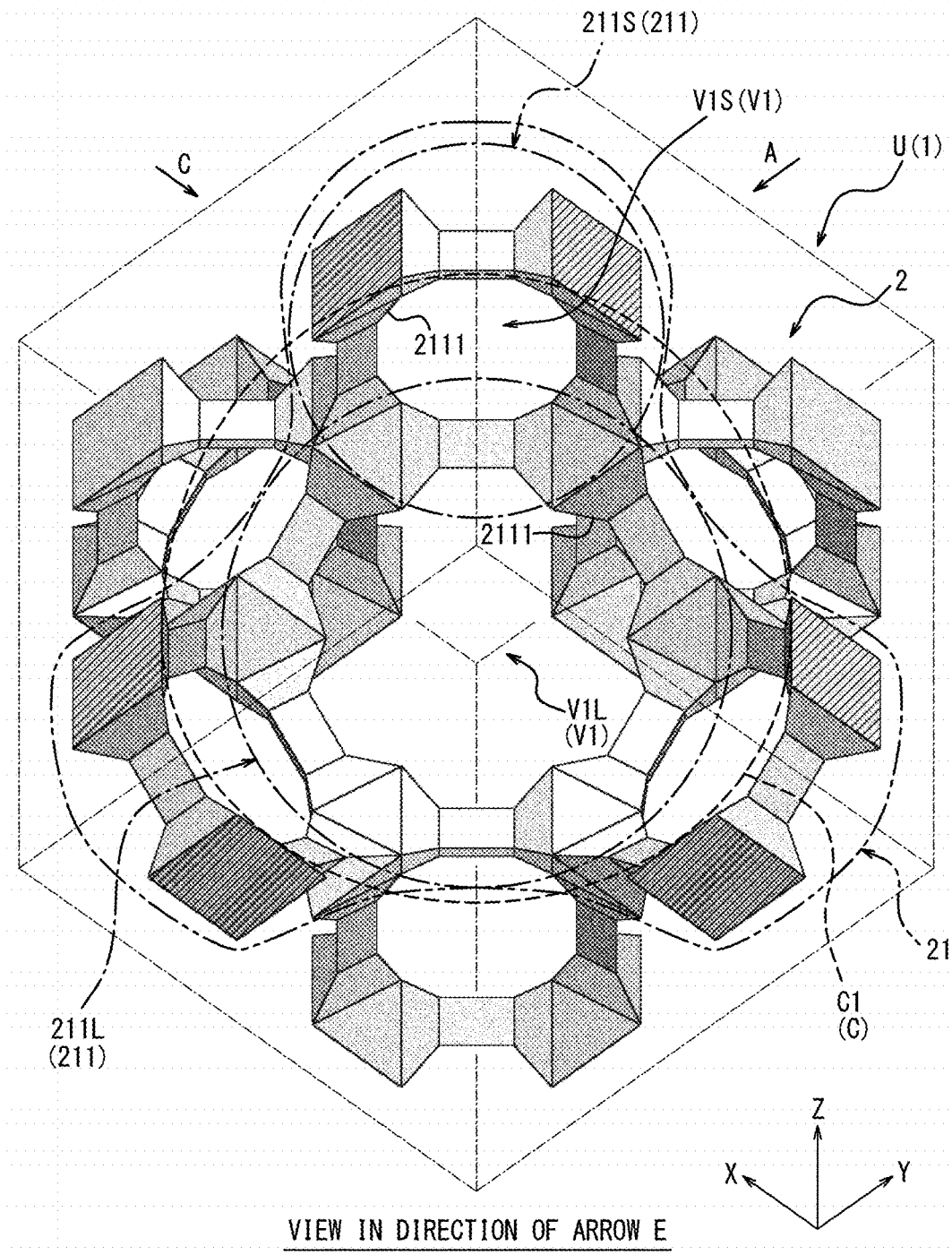
FIG. 6 is a drawing same as FIG. 5 with some reference signs, dashed lines, and dashed-dotted lines being different from those in FIG. 5.

FIGS. 3 to 6 illustrate one unit part U alone. In FIG. 3, the unit part U is viewed in a direction substantially same as that of FIG. 2, in other words, the unit part U is viewed in the direction of arrow D in FIG. 1. In FIG. 4, part of FIG. 3 is viewed in an enlarged manner. In FIGS. 5 and 6, which are the same drawing, the same part of the unit part U as that in FIG. 3 is viewed from below, in other words, the unit part U is viewed in the direction of arrow E in FIG. 3. Only difference between FIGS. 5 and 6 is that different dashed lines and dashed-dotted lines illustrated for visibility of the drawings. For reference, arrows A and C in FIGS. 1 and 2 are also illustrated in FIGS. 3 and 5.

As illustrated in FIGS. 1 to 6, the skeleton part 2 of the resin foamed body 1 includes a plurality of bone parts 2B and a plurality of connection parts 2J. More specifically, in the illustrated example, the entire skeleton part 2 is integrally made of the plurality of bone parts 2B and the plurality of connection parts 2J. In the present example, each bone part 2B has a column shape, and in the present example, extends straight between the corresponding pair of connection parts 2J. Each connection part 2J connects end parts 2Be of a plurality (in the illustrated example, two to six) of bone parts 2B extending in directions different from each other, at a place where the end parts 2Be are adjacent to each other.

However, a bone part 2B and a connection part 2J at part of the skeleton part 2 may be divided from each other, and a bone part 2B may be divided halfway through extension thereof. Such division can occur in, for example, the foaming process or the open-cell formation process thereafter in manufacturing of the resin foamed body 1.

In FIGS. 4 and 5, a skeleton line O of the skeleton part 2 is illustrated at part of the resin foamed body 1. The skeleton line O of the skeleton part 2 includes a skeleton line O of each bone part 2B and a skeleton line O of each connection part 2J. The skeleton line O of each bone part 2B is the central axis (barycenter line) of the bone part 2B and constituted by the central axis of a bone constant part 2B1 and the central axis of a bone change part 2B2 to be described later. The skeleton line O of each connection part 2J is an extended line part obtained when the central axes of bone parts 2B connected with the connection part 2J smoothly extend into the connection part 2J and are coupled with each other.

The extension direction of each bone part 2B is the extension direction of the skeleton line O of the bone part 2B (a part corresponding to the bone part 2B in the skeleton line O; this is same in the following). In the present example, the skeleton line O of each bone part 2B extends straight.

The resin foamed body 1, which entirely includes the skeleton part 2, can perform compressing and restoring deformation in accordance with application and cancellation of external force, and thus has excellent characteristics as a cushion member.

Note that some or all of the bone parts 2B included in the skeleton part 2 may extend in curved shapes.

Each edge part (side part where a pair of surfaces adjacent to each other face) of the skeleton part 2 is angulated in the drawings but may be smoothly curved.

In the illustrated example, the bone parts 2B included in the skeleton part 2 have substantially same shapes and dimensions. However, the present disclosure is not limited to the present example, but the shapes and/or and dimensions of the bone parts 2B included in the skeleton part 2 may not be same, and for example, the shapes and/or dimensions of some bone parts 2B may be different from those of the other bone parts 2B.

Figure 7A:
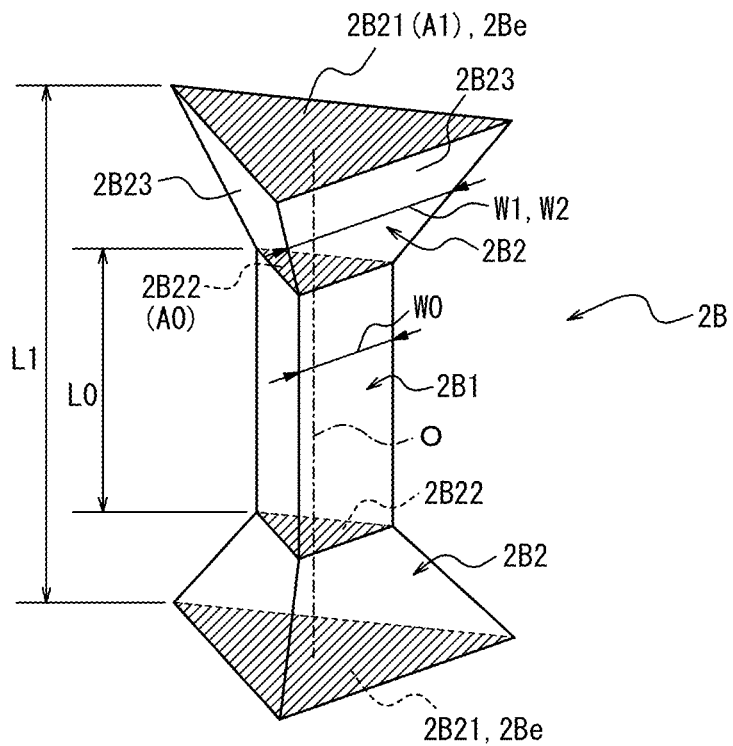
FIG. 7A is a perspective view illustrating a bone part of the resin foamed body in FIG. 1 in a state in which no external force is applied.
Figure 7B:
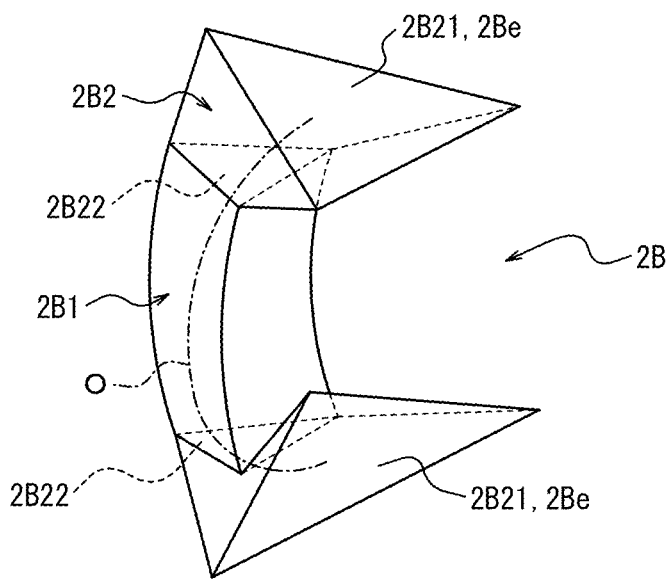
FIG. 7B is a perspective view illustrating the bone part of FIG. 7A in a state in which external force is applied.

FIG. 7 illustrates each bone part 2B of the present example alone. FIG. 7A illustrates a natural state in which no external force is applied to the bone part 2B, and FIG. 7B illustrates a state in which external force is applied to the bone part 2B. In FIG. 7, the central axis (skeleton line O) of the bone part 2B is illustrated.

As illustrated in FIG. 7A, each bone part 2B is constituted by a bone constant part 2B1 extending while keeping cross-sectional area substantially constant, and a pair of bone change parts 2B2 extending from the bone constant part 2B1 to the corresponding connection part 2J while gradually increasing cross-sectional area at both sides of the bone constant part 2B1 in the extension direction.

As for the bone constant part 2B1, "extending while keeping cross-sectional area substantially constant" also includes a case in which in which the cross-sectional area of the bone constant part 2B1 slightly varies halfway through the extension, and specifically, a case in which the maximum value of the cross-sectional area of the bone constant part 2B1 is equal to or smaller than 110% of the minimum value of the cross-sectional area of the bone constant part 2B1. The boundary between the bone constant part 2B1 and the bone change part 2B2 is a starting point where the cross-sectional area of the bone part 2B starts increasing from the bone constant part 2B1 toward the bone change part 2B2 side.

Note that the present disclosure is not limited to the present example, but only some bone parts 2B included in the skeleton part 2 may satisfy the above-described configuration. In this case, for example, some bone parts 2B included in the skeleton part 2 may each only include the bone constant part 2B1. Alternatively, some bone parts 2B included in the skeleton part 2 may each include the bone change part 2B2 only at an end part of the bone constant part 2B1 on one side whereas an end part of the bone constant part 2B1 on the other side may be directly connected with the corresponding connection part 2J.

The cross-sectional area of the bone constant part 2B1 and the cross-sectional area of the bone change part 2B2 are the cross-sectional area of a section of the bone constant part 2B1 and the cross-sectional area of a section of the bone change part 2B2, respectively, which are orthogonal to the skeleton line O.

In the present example, since each bone part 2B included in the resin foamed body 1 is constituted by the bone constant part 2B1 and the bone change part 2B2 and the cross-sectional area of the bone change part 2B2 gradually increases as the position moves from the bone constant part 2B1 toward the connection part 2J, the bone part 2B has a constricted shape tapered toward the bone constant part 2B1 at a vicinity part of the boundary between the bone constant part 2B1 and the bone change part 2B2. Thus, when external force is applied, the bone part 2B is likely to perform buckling deformation at the constricted part and a middle part of the bone constant part 2B1, and accordingly, the resin foamed body 1 is likely to deform (FIG. 7B). As a result, the resin foamed body 1 can provide an improved sense of touch and can also provide soft surface touch.

In the present embodiment, as for the plurality of bone parts 2B included in the skeleton part 2, in each of the plurality of bone parts 2B, an average value AV(A0/A1) of a ratio A0/A1 of cross-sectional area A0 (FIG. 7) of the bone change part 2B2 of each bone part 2B at an edge 2B22 on the bone constant part 2B1 side relative to cross-sectional area A1 (FIG. 7) of the bone change part 2B2 at an edge 2B21 on the connection part 2J side satisfies $$0.15 \leq AV(A0/A1) < 0.5$$

Note that the average value AV(A0/A1) of the ratio A0/A1 is a value obtained by dividing the sum of the ratio A0/A1 of each bone part 2B included in the skeleton part 2 by the number of bone parts 2B included in the skeleton part 2. When each bone part 2B includes two bone change part 2B2, the ratio A0/A1 of the bone part 2B is the average value of the ratios A0/A1 for the bone change parts 2B2.

The above-described average value AV(A0/A1) of the ratio A0/A1 is a value higher than that of a conventional typical resin foamed body. When the average value AV(A0/A1) of the ratio A0/A1 is 0.15 or larger, the ratio of rigidity in the shear direction (hereinafter referred to as "shearing rigidity") relative to rigidity in the compression direction (hereinafter referred to as "compression rigidity") is smaller than when the average value AV(A0/A1) of the ratio A0/A1 is smaller than 0.15. Thus, it is possible to reduce the shearing rigidity while maintaining the compression rigidity. Accordingly, when a user applies weight to the resin foamed body 1, the area of contact of the resin foamed body 1 to the user can be increased to improve a sense (sense of touch) of being sucked (embraced) by the resin foamed body 1, which the user can have. This range is preferable particularly when the resin foamed body 1 is used for a seat pad (particularly, a car seat pad).

In addition, when the average value AV(A0/A1) of the ratio A0/A1 is equal to or larger than 0.15, the resin foamed body 1 can provide softer surface touch than when the average value AV(A0/A1) of the ratio A0/A1 is smaller than 0.15.

Moreover, when the average value AV(A0/A1) of the ratio A0/A1 is equal to or larger than 0.15, the weight of the resin foamed body 1 can be reduced while the hardness of the resin foamed body 1 is maintained, as compared to a case in which the average value AV(A0/A1) of the ratio A0/A1 is smaller than 0.15.

For the same reason, the average value AV(A0/A1) of the ratio A0/A1 is preferably equal to or larger than 0.20.

When the average value AV(A0/A1) of the ratio A0/A1 is smaller than 0.5, the easiness of manufacturing the resin foamed body 1 through a foaming process (a foaming shaping process using a mold or a slab shaping process) can be sufficiently ensured as compared to a case in which the average value AV(A0/A1) of the ratio A0/A1 is equal to or larger than 0.5.

For the same reason, the average value AV(A0/A1) of the ratio A0/A1 is preferably equal to or smaller than 0.45.

As illustrated in FIGS. 1 to 7, in the present example, the cross-sectional area of the bone constant part 2B1 of each bone part 2B included in the skeleton part 2 is smaller than those of the bone change part 2B2 and the corresponding connection part 2J. More specifically, the cross-sectional area of the bone constant part 2B1 is smaller than the cross-sectional area of any part (except for a boundary part between the bone constant part 2B1 and the bone change part 2B2) of each of the bone change part 2B2 and the connection part 2J. In other words, the bone constant part 2B1 is a part having smallest cross-sectional area (narrowest) in the skeleton part 2. Accordingly, the bone constant part 2B1 is likely to deform when external force is applied as described above. Thus, the resin foamed body 1 can provide an improved sense of touch and can also provide softer surface touch.

Note that the cross-sectional area of the connection part 2J is the cross-sectional area of a section orthogonal to the skeleton line O of the connection part 2J.

Note that the present disclosure is not limited to the present example, but only some bone parts 2B included in the skeleton part 2 may satisfy the above-described configuration as long as the above-described average value AV(A0/A1) of the ratio A0/A1 is within the above-described range, and in this case as well, the same effect can be obtained to some different extent.

Similarly, in the present example, the width of the bone constant part 2B1 of each bone part 2B included in the skeleton part 2 is smaller than those of the bone change part 2B2 and the corresponding connection part 2J. More specifically, the width of the bone constant part 2B1 is smaller the width of any part (except for the boundary part between the bone constant part 2B1 and the bone change part 2B2) of each of the bone change part 2B2 and the connection part 2J. In other words, the bone constant part 2B1 is a part having a smallest width (narrowest) in the skeleton part 2. Accordingly, the bone constant part 2B1 is likely to deform when external force is applied, and thus the resin foamed body 1 can provide an improved sense of touch and can also provide softer surface touch.

Note that the widths of the bone constant part 2B1, the bone change part 2B2, and the connection part 2J are maximum widths measured along sections of the bone constant part 2B1, the bone change part 2B2, and the connection part 2J, respectively, each passing through a point on the skeleton line O and orthogonal to the skeleton line O. The skeleton line O of the connection part 2J is part of the skeleton line O corresponding to the connection part 2J. In FIG. 7A, a width W0 of the bone constant part 2B1 and a width W1 of the bone change part 2B2 are indicated for reference.

Note that the present disclosure is not limited to the present example, but only some bone parts 2B included in the skeleton part 2 may satisfy the above-described configuration, and in this case as well, the same effect can be obtained to some different extent.

As illustrated in FIG. 7, in the present example, the bone change part 2B2 of each bone part 2B included in the skeleton part 2 has, as side surfaces, one or a plurality (in the present example, three) tilted surfaces 2B23, the tilted surface 2B23 is tilted (at a tilt smaller than 90°) relative to the extension direction of the bone change part 2B2, and a width W2 gradually increase as the position moves from the bone constant part 2B1 toward the connection part 2J.

With this configuration as well, when external force is applied, the bone part 2B is likely to perform buckling deformation at the constricted part in the vicinity of the boundary between the bone constant part 2B1 and the bone change part 2B2. Accordingly, the resin foamed body 1 can provide an improved sense of touch and can also provide softer surface touch.

The extension direction of the bone change part 2B2 is the extension direction of the central axis (skeleton line O) of the bone change part 2B2. The width W2 of each tilted surface 2B23 of the bone change part 2B2 is the width of the tilted surface 2B23, which is measured along a section orthogonal to the skeleton line O of the bone change part 2B2.

Note that the present disclosure is not limited to the present example, only some bone parts 2B included in the skeleton part 2 may satisfy the above-described configuration as long as the above-described average value AV(A0/A1) of the ratio A0/A1 is within the above-described range, and in this case as well, the same effect can be obtained to some different extent.

In the present example, the cross-sectional shapes of the bone constant part 2B 1 and the bone change part 2B2 of each bone part 2B included in the skeleton part 2 are substantially triangular (specifically, substantially regular triangular) shapes. In other words, in the present example, the cross-sectional shape of each bone part 2B is substantially same (substantially triangular) over its entire length.

Note that the cross-sectional shapes of the bone constant part 2B1 and the bone change part 2B2 are shapes at a section orthogonal to the central axis (skeleton line O) of the bone constant part 2B1 and a section orthogonal to the central axis (skeleton line O) of the bone change part 2B2, respectively.

Note that the present disclosure is not limited to the present example, only some bone parts 2B included in the skeleton part 2 may satisfy the above-described configuration, and in this case as well, the same effect can be obtained to some different extent.

In some or all bone parts 2B included in the skeleton part 2, the cross-sectional shapes of the bone constant part 2B1 and the bone change part 2B2 may be each a substantially polygonal shape (substantially rectangular shape) other than a substantially triangular shape or may be each a substantially circular shape (such as a substantially exact circular shape or a substantially elliptical shape). The cross-sectional shapes of the bone constant part 2B1 and the bone change part 2B2 may be different from each other.

In the present example, each connection part 2J has a cross-sectional shape different from that of each bone part 2B. In other words, in the present example, the boundary between the connection part 2J and the bone part 2B is a place where the cross-sectional shape changes from the bone part 2B to the connection part 2J side along the central axis (skeleton line O) of the skeleton part 2.

In the resin foamed body 1 of the present embodiment, as for the plurality of bone parts 2B included in the skeleton part 2, in each of the plurality of bone parts 2B, an average value AV(L0/L1) of a ratio L0/L1 of a length L0 (FIG. 7) of the bone constant part of each bone part 2B included in the skeleton part 2 relative to a length L1 (FIG. 7) of the bone part 2B preferably satisfies $$0.5 \leq AV(L0/L1) < 1.0$$

Note that the average value AV(L0/L1) of the ratio L0/L1 is a value obtained by dividing the sum of the ratios L0/L1 of the plurality of bone parts 2B included in the skeleton part 2 by the number of bone parts 2B included in the skeleton part 2.

When the average value AV(L0/L1) of the ratio L0/L1 is equal to or larger than 0.5, the ratio of the shearing rigidity relative to the compression rigidity is smaller than when the average value AV(L0/L1) of the ratio L0/L1 is smaller than 0.5. Thus, it is possible to reduce the shearing rigidity while maintaining the compression rigidity. Accordingly, when the user applies weight to the resin foamed body 1, the area of contact of the resin foamed body 1 to the user can be increased to improve sense of touch that the user can have. This range is preferable particularly when the resin foamed body 1 is used for a seat pad (particularly, a car seat pad).

In addition, when the average value AV(L0/L1) of the ratio L0/L1 is equal to or larger than 0.5, the resin foamed body 1 can provide softer surface touch than when the average value AV(L0/L1) of the ratio L0/L1 is smaller than 0.5.

As illustrated in FIGS. 1 to 6, in the illustrated example, the resin foamed body 1 has two kinds of cell holes C, namely, a first cell hole C1 and a second cell hole C2 having a diameter smaller that of the first cell hole C1.

In the present example, each cell hole C (the first cell hole C1 or the second cell hole C2) has a substantially polyhedral shape. More specifically, in the present example, the first cell hole C1 has a substantially Kelvin's tetradecahedral (truncated octahedral) shape. A Kelvin's tetradecahedron (truncated octahedron) is a polyhedron constituted by six square constituent faces and eight regular hexagonal constituent faces. In the present example, the second cell hole C2 has a substantially octahedral shape. However, in the illustrated example, since each bone part 2B includes not only the bone constant part 2B1 but also the bone change parts 2B2 on both sides thereof, the shapes of the first cell hole C1 and the second cell hole C2 are each not a mathematical (complete) Kelvin's tetradecahedron or octahedron.

Schematically, the cell holes C included in the resin foamed body 1 are regularly arrayed to spatially fill the internal space surrounded by the outer edge (outer outline) of the resin foamed body 1 (to reduce each gap (interval) among the cell holes C). Each second cell hole C2 is disposed to fill a small gap (interval) among first cell holes C1.

When some or all (in the present example, all) cell holes C of the resin foamed body 1 have substantially polyhedral shapes as in the present example, each gap (interval) among cell holes C included in the resin foamed body 1 is further reduced, and a larger number of cell holes C can be formed inside the resin foamed body 1. With this configuration, the behavior of compressing and restoring deformation of the resin foamed body 1 in accordance with application and cancellation of external force is more favorable as a cushion member, particularly as a seating cushion member.

The polyhedron shape of each cell hole C is not limited to the present example but may be optional. For example, a configuration in which each first cell hole C1 has a substantially tetrahedral, substantially octahedral, or substantially dodecahedral shape is preferable to reduce each gap (interval) among cell holes C. Alternatively, the shapes of some or all cell holes C of the resin foamed body 1 may be each a stereoscopic shape (for example, a sphere, an ellipsoid, or a cylinder) other than a substantially polyhedral shape. The resin foamed body 1 may have only cell holes C of one kind (for example, only the first cell holes C1) or may include cell holes C of three or more kinds.

In the illustrated example, each first cell hole C1 is constituted by eight unit parts U, two being arrayed in each of the X, Y, and Z directions. Each unit part U serves as parts of a plurality of first cell holes C1. Two second cell holes C2 are disposed for each unit part U.

However, the present disclosure is not limited to the present example, but each cell hole C of the resin foamed body 1 may be constituted by an optional number of unit parts U, and each unit part U may be included in an optional number of cell holes C.

As illustrated in FIGS. 1 and 2, in the present example, the skeleton part 2 includes a plurality of first cell defining parts 21 that each define the corresponding first cell hole C1 inside (in the number of first cell holes C1).

As illustrated in FIGS. 1 to 6, each first cell defining part 21 includes a plurality (in the present example, 14) of first annular parts 211. Each first annular part 211 has an annular shape, and an inner periphery side edge part 2111 thereof defines a first virtual surface V1 that is substantially flat. The plurality of first annular parts 211 included in the first cell defining part 21 are coupled with each other so that the first virtual surfaces V1 defined by the respective inner periphery side edge parts 2111 thereof do not intersect with each other.

Each first cell hole C1 is defined by the plurality of first annular parts 211 included in the first cell defining part 21, and the plurality of first virtual surfaces V1 defined by the plurality of respective first annular parts 211. Schematically, each first annular part 211 is a part that defines a side of the stereoscopic shape of the first cell hole C1, and each first virtual surface V1 is a part that defines a constituent face of the stereoscopic shape of the first cell hole C1.

Each first annular part 211 is constituted by a plurality of bone parts 2B and a plurality of connection parts 2J connecting the end parts 2Be of the plurality of bone parts 2B. A coupling portion of each pair of first annular parts 211 coupled with each other is constituted by one bone part 2B and a pair of connection parts 2J at both sides thereof, which are shared by the pair of first annular parts 211.

In each first virtual surface V1 (except for a first virtual surface V1 also serving as a second virtual surface V2 to be described later), a surface of the first virtual surface V1 on one side (front surface of the first virtual surface V1) defines part of a first cell hole C1, and a surface of the first virtual surface V1 on the other side (back surface of the first virtual surface V1) defines part of another first cell hole C1.

In the present example, each first virtual surface V1 is not covered with a film but is opened, in other words, has an opening. Thus, cell holes C are communicated with each other through the first virtual surface V1 to allow ventilation between the cell holes C. Accordingly, the breathability of the resin foamed body 1 is improved, and compressing and restoring deformation of the resin foamed body 1 in accordance with application and cancellation of external force can be easily performed.

As illustrated in FIGS. 1 to 6, in the present example, the plurality (in the present example, 14) first annular parts 211 included in each first cell defining part 21 each include one or a plurality (in the present example, six) of first small annular parts 211S and one or a plurality (in the present example, eight) of first large annular parts 211L. The inner periphery side edge part 2111 of each first small annular part 211S defines a first small virtual surface V1S that is flat. The inner periphery side edge part 2111 of each first large annular part 211L defines a first large virtual surface V1L that has an area larger than that of the first small virtual surface V1S.

FIG. 5 illustrates the skeleton line O of part of each unit part U, which serves as a first cell defining part 21. As understood from FIG. 5, in the present example, the skeleton line O of each first large annular part 211L has a regular hexagonal shape, and accordingly, the corresponding first large virtual surface V1L substantially has a regular hexagonal shape. In the present example, the skeleton line O of each first small annular part 211S has a square shape, and accordingly, the corresponding first small virtual surface ViS substantially has a square shape. In this manner, in the present example, the first small virtual surface V1S and the first large virtual surface ViL are different from each other not only in area but also in shape.

Each first large annular part 211L is constituted by a plurality (in the present example, six) of bone parts 2B and a plurality (in the present example, six) of connection parts 2J connecting the end parts 2Be of the plurality of bone parts 2B. Each first small annular part 211S is constituted by a plurality (in the present example, four) of bone parts 2B and a plurality (in the present example, four) of connection parts 2J connecting the end parts 2Be of the plurality of bone parts 2B.

Since the plurality of first annular parts 211 included in the first cell defining part 21 include the first small annular part 211S and the first large annular part 211L having different sizes, each gap (interval) among first cell holes C1 included in the resin foamed body 1 can be further reduced.

Moreover, when the shapes of the first small annular part 211S and the first large annular part 211L are different from each other as in the present example, each gap (interval) among first cell holes C1 included in the resin foamed body 1 can be further reduced.

However, the plurality of first annular parts 211 included in the first cell defining part 21 may have the same size and/or shape.

When some or all (in the present example, all) first virtual surfaces V1 included in the first cell defining part 21 have substantially polygonal shapes as in the present example, the interval among cell holes C included in the resin foamed body 1 can be further reduced. Moreover, the behavior of compressing and restoring deformation of the resin foamed body 1 in accordance with application and cancellation of external force is more favorable as a cushion member, particularly as a seating cushion member.

Note that at least one first virtual surface V1 included in the resin foamed body 1 may have an optional substantially polygonal shape other than a substantially regular hexagonal shape and a substantially square shape as in the present example or have a planar shape (for example, a circle (such as an exact circle or an ellipse)) other than a substantially polygonal shape.

As illustrated in FIG. 1, in the present example, the skeleton part 2 includes a plurality of second cell defining parts 22 (in the number of second cell holes C2) that each define a second cell hole C2 inside.

As illustrated in FIG. 4, each second cell defining part 22 includes a plurality (in the present example, two) of second annular parts 222. Each second annular part 222 has an annular shape, and an inner periphery side edge part 2221 thereof defines a second virtual surface V2 that is substantially flat. The second annular parts 222 included in the second cell defining part 22 are coupled with each other so that the second virtual surfaces V2 defined by the respective inner periphery side edge parts 2221 intersect with (in the present example, are orthogonal to) each other.

Each second cell hole C2 is defined by the inner periphery side edge parts 2221 of the respective second annular parts 222 included in the corresponding second cell defining part 22 and by virtual surfaces smoothly coupling the inner periphery side edge parts 2221.

FIG. 4 illustrates the skeleton line O of part of each unit part U, which serves as a second cell defining part 22. As understood from FIG. 4, in the present example, the skeleton line O of each second annular part 222 included in the second cell defining part 22 has a square shape, and accordingly, the corresponding second virtual surface V2 has a substantially square shape.

Each second annular part 222 is constituted by a plurality (in the present example, four) of bone parts 2B, and a plurality (in the present example, four) of connection parts 2J connecting the end parts 2Be of the plurality of bone parts 2B.

In the present example, each coupling portion of second annular parts 222 included in each second cell defining part 22 is constituted by two connection parts J shared by the second annular parts 222.

In the present example, the second virtual surfaces V2 included in each second cell defining part 22 have substantially the same shape and area.

Note that the shape of each second virtual surface V2 included in each second cell defining part 22 is not limited to the present example but may be an optional substantially polygonal shape other than a substantial square or have a planar shape (for example, a circle (such as an exact circle, or an ellipse)) other than a substantially polygonal shape.

As illustrated in FIG. 4, in the illustrated example, one of the two second annular parts 222 included in each second cell defining part 22 also serves as a first annular part 211 (more specifically, first small annular part 211S).

In the illustrated example, each second virtual surface V2 is not covered with a film but is opened, in other words, has an opening. Thus, cell holes C (in particular, a first cell hole C1 and a second cell hole C2) are communicated with each other through the second virtual surface V2 to allow ventilation between the cell holes C. Accordingly, the breathability of the resin foamed body 1 can be improved, and compressing and restoring deformation of the resin foamed body 1 in accordance with application and cancellation of external force can be easily performed.

Figure 8:
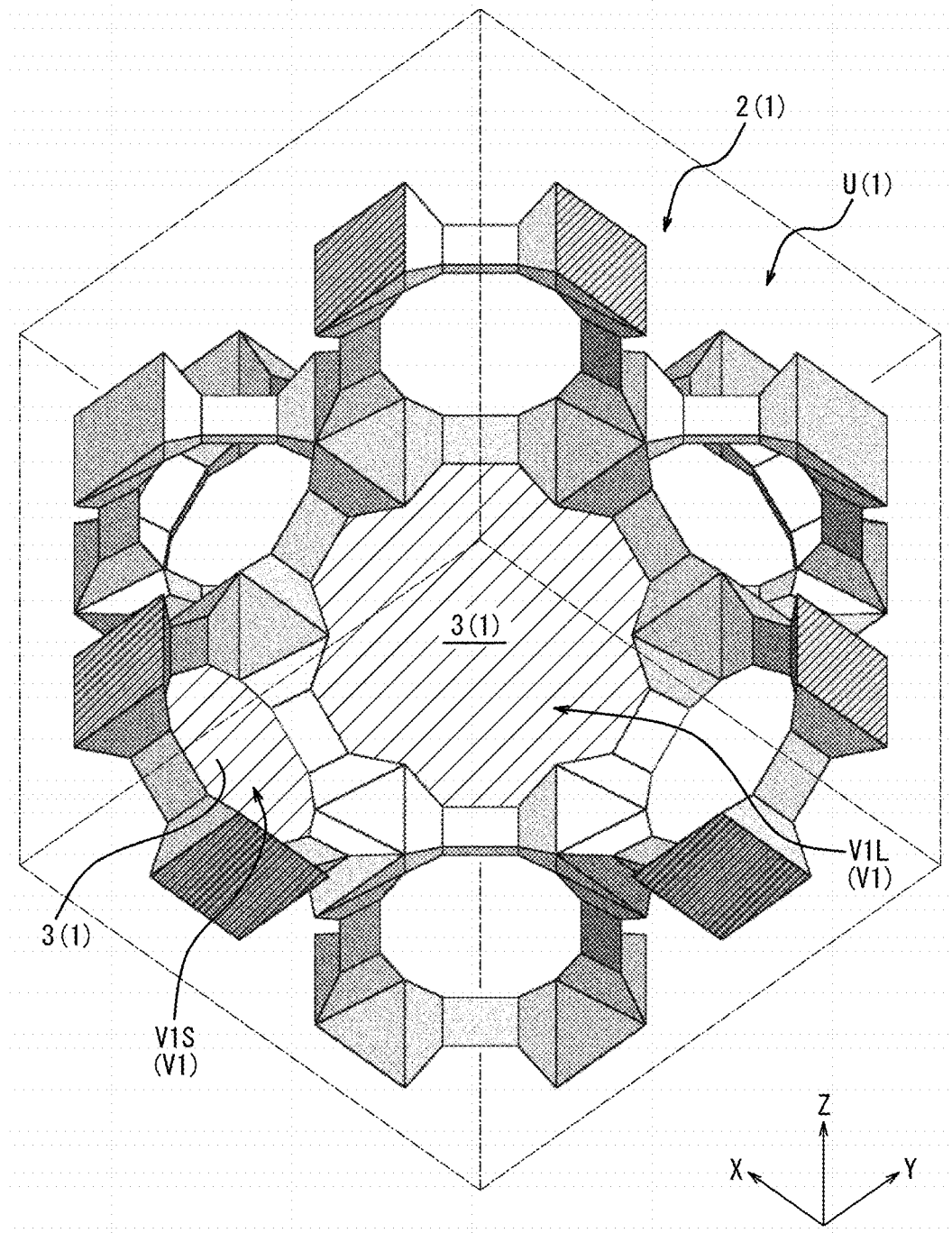
FIG. 8 is a drawing corresponding to FIG. 6, for description of the resin foamed body according to a first modification of the present disclosure.

Note that as in a first modification illustrated in FIG. 8, at least one first virtual surface V1 included in the resin foamed body 1 may be covered with the film 3. The film 3 is made of a material same as that of the skeleton part 2 and integrated with the skeleton part 2. The film 3 prevents communication between two first cell holes C1 sandwiching the first virtual surface V1 therebetween, and accordingly, the breathability of the resin foamed body 1 as a whole degrades. The breathability of the resin foamed body 1 as a whole can be adjusted by adjusting the number of first virtual surfaces V1 included in the resin foamed body 1 and covered with the film 3, and various breathability levels can be achieved in accordance with a request.

Note that when the resin foamed body 1 is used as a cushion member (for example, as a seat pad, particularly, as a car seat pad), it is not preferable that all first virtual surfaces V1 included in the resin foamed body 1 are covered with the film 3, in other words, it is preferable that at least one first virtual surface V1 included in the resin foamed body 1 is not covered with the film 3 but is opened.

As described above, the resin foamed body of the present disclosure is preferably used for a cushion member, more preferably used for, for example, a seating cushion member (such as a seat pad, particularly, a car seat pad) or a bed.

Figure 9:
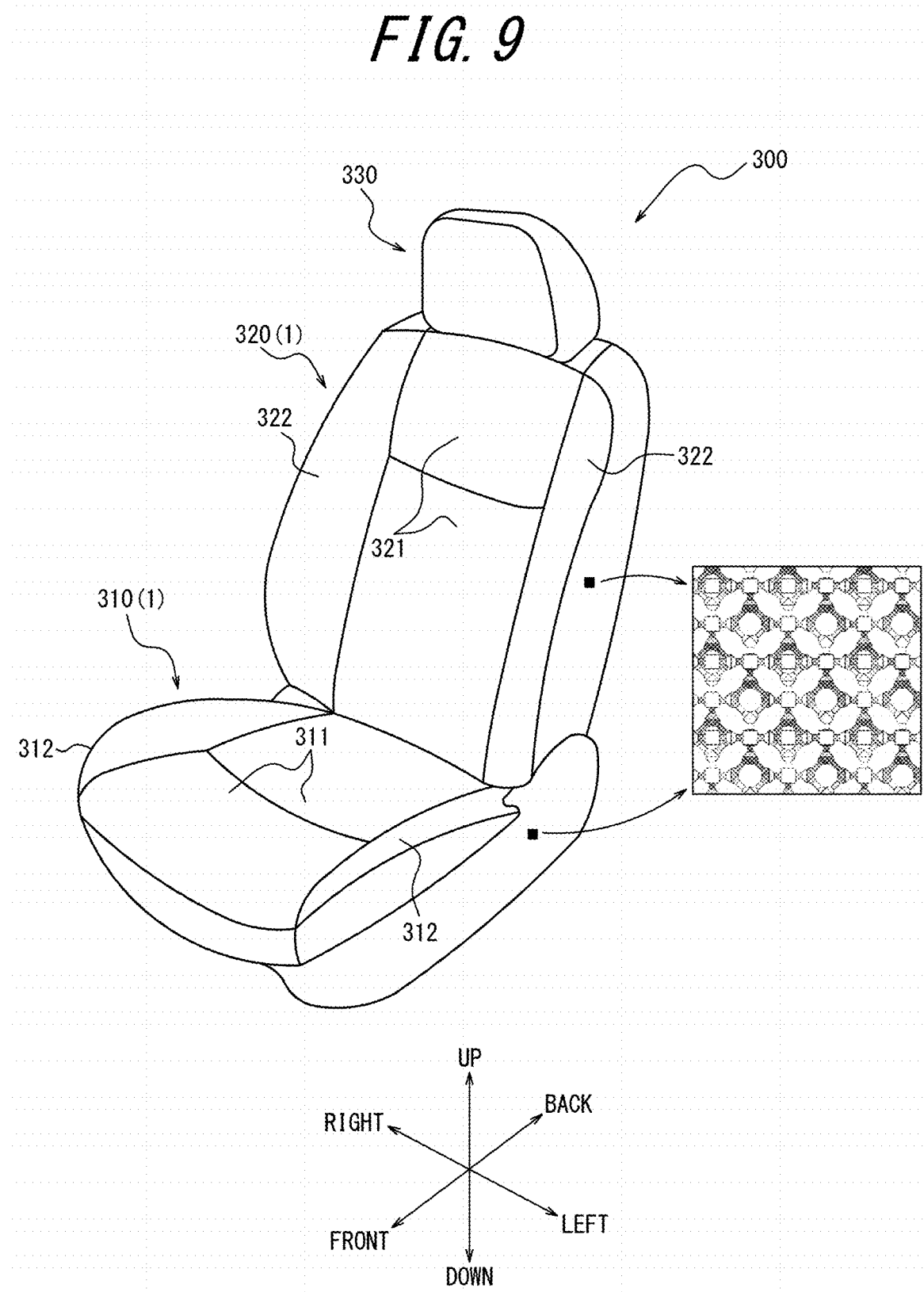
FIG. 9 is a perspective view illustrating a car seat pad including the resin foamed body according to an embodiment of the present disclosure.

FIG. 9 illustrates, as an example, a car seat pad 300 including the resin foamed body 1 of the example illustrated in FIG. 1. The car seat pad 300 in the example illustrated in FIG. 9 includes a cushion pad 310 on which a seated person sits, and a back pad 320 for supporting the back of the seated person. The cushion pad 310 and the back pad 320 each serve as the car seat pad 300.

FIG. 9 illustrates "up", "down", "left", "right", "front", and "back" directions when viewed from the seated person sitting on the car seat pad 300.

The cushion pad 310 includes a main pad 311 formed to support the hip region and the femoral region of the seated person, and a pair of side pads 312 positioned on right and left both sides of the main pad 311 and protruding upward beyond the main pad 311. The back pad 320 includes a main pad 321 formed to support the back of the seated person, and a pair of side pads 322 positioned on right and left both sides of the main pad 321 and protruding forward beyond the main pad 321.

In the example illustrated in FIG. 9, the cushion pad 310 and the back pad 320 are formed of separate resin foamed bodies 1 (as separate members).

The cushion pad 310 is entirely integrally formed. The back pad 320 is entirely integrally formed.

A head rest 330 is provided above the back pad 320 in some cases. The head rest 330 may be separated from or integrated with the back pad 320.

When the resin foamed body 1 is used for the cushion pad 310 and/or the back pad 320 of the car seat pad 300 as in the example illustrated in FIG. 9, a sense (sense-of-touch) of being sucked (embraced) by the car seat pad 300 can be excellently felt by the seated person sitting on the car seat pad 300, and thus seating comfort can be improved.

EXAMPLES

Comparative examples and examples of the resin foamed body of the present disclosure were evaluated by analysis, which will be described below.

3D-CAD models of Comparative Example 1 and Examples 1 to 5 of the resin foamed body of the present disclosure were produced on a PC, and analysis was performed. Results thereof are illustrated in FIGS. 10 to 12.

Resin foamed body models of Comparative Example 1 and Examples 1 to 5 are each flexible and entirely include the skeleton part 2, the skeleton part 2 includes the plurality of bone parts 2B and the plurality of connection parts 2J connecting the end parts 2Be of the plurality of bone parts 2B, and the plurality of bone parts 2B each include the bone constant part 2B1 extending while keeping cross-sectional area constant, and the pair of bone change parts 2B2 extending from the bone constant part 2B1 to the pair of connection parts 2J while gradually increasing cross-sectional area. The materials of the resin foamed body models of Comparative Example 1 and Examples 1 to 5 have the same properties (such as rigidity) of materials thereof. In the resin foamed body models of Comparative Example 1 and Examples 1 to 5, the bone parts 2B included in the skeleton part 2 have the same shape and dimension.

Comparative Example 1 and Examples 1 and 2 (FIGS. 10A, 11A, and 12) are different from one another only in the ratio A0/A1 (that is, the average value AV(A0/A1)) of each bone part 2B. Note that the ratio L0/L1 (that is, the average value AV(L0/L1)) of each bone part 2B is 0.6 in Comparative Example 1 and Examples 1 and 2.

Examples 3 to 5 (FIGS. 10B and 11B) are different from one another only in the ratio L0/L1 (that is, the average value AV(L0/L1)) of each bone part 2B. Note that the ratio A0/A1 (that is, the average value AV(A0/A1)) of each bone part 2B is 0.20 in Examples 3 to 5.

A sense of touch (static deflection characteristic) and a sense of surface touch were evaluated for each of Comparative Example 1 and Examples 1 to 5. In addition, a lightweight characteristic was evaluated for Comparative Example 1 and Examples 1 and 2.

[Evaluation of Sense of Touch (Static Deflection Characteristic)]

Figure 10A:
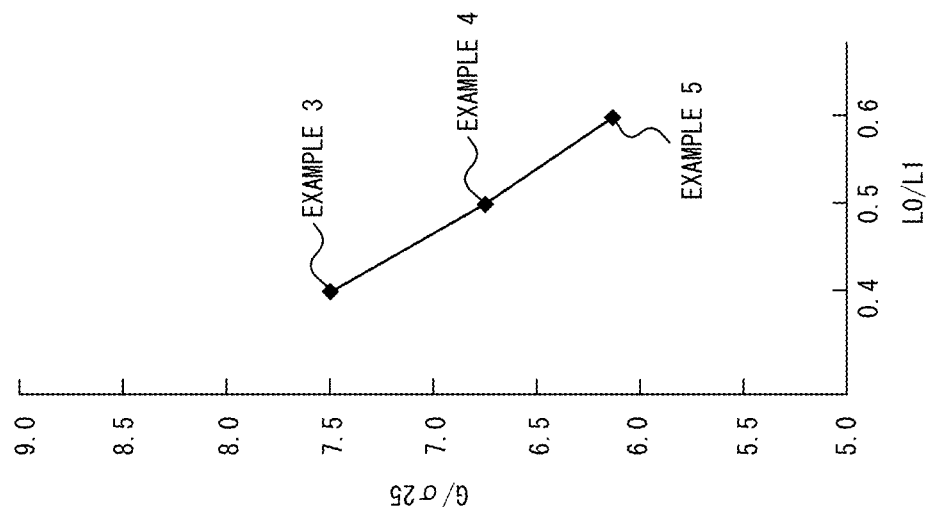
FIG. 10A is a drawing illustrating results of static deflection characteristic (sense-of-touch) analysis performed for the resin foamed body according to Comparative Example 1 and Examples 1 and 2 of the present disclosure.
Figure 10B:
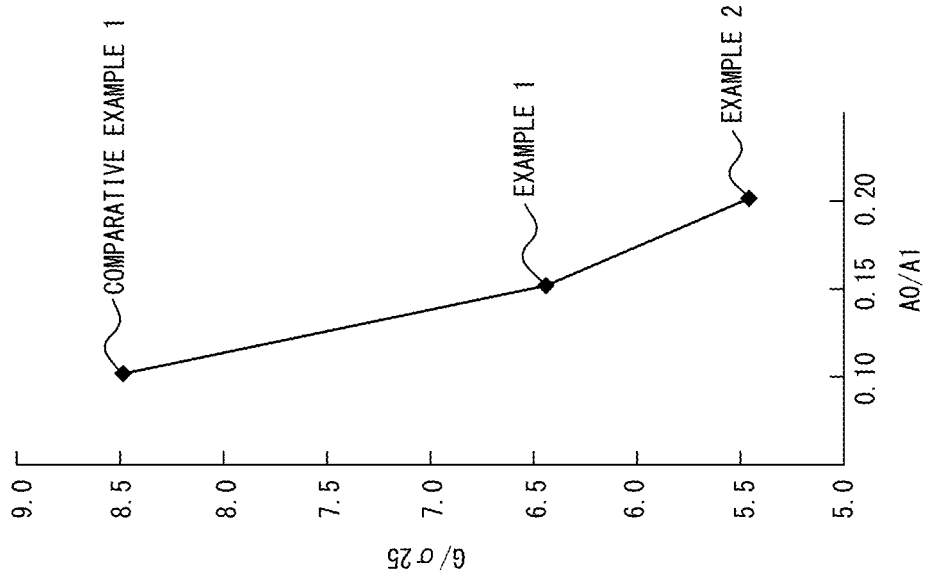
FIG. 10B is a drawing illustrating results of static deflection characteristic (sense-of-touch) analysis performed for the resin foamed body according to Examples 3 to 5 of the present disclosure.

In evaluation of the sense of touch (static deflection characteristic), a value $G/\sigma 25$ obtained by dividing shearing rigidity G by 25% stress $\sigma 25$ was calculated for each of Comparative Example 1 and Examples 1 to 5. Results thereof are illustrated in FIGS. 10A and 10B.

Figure 13:
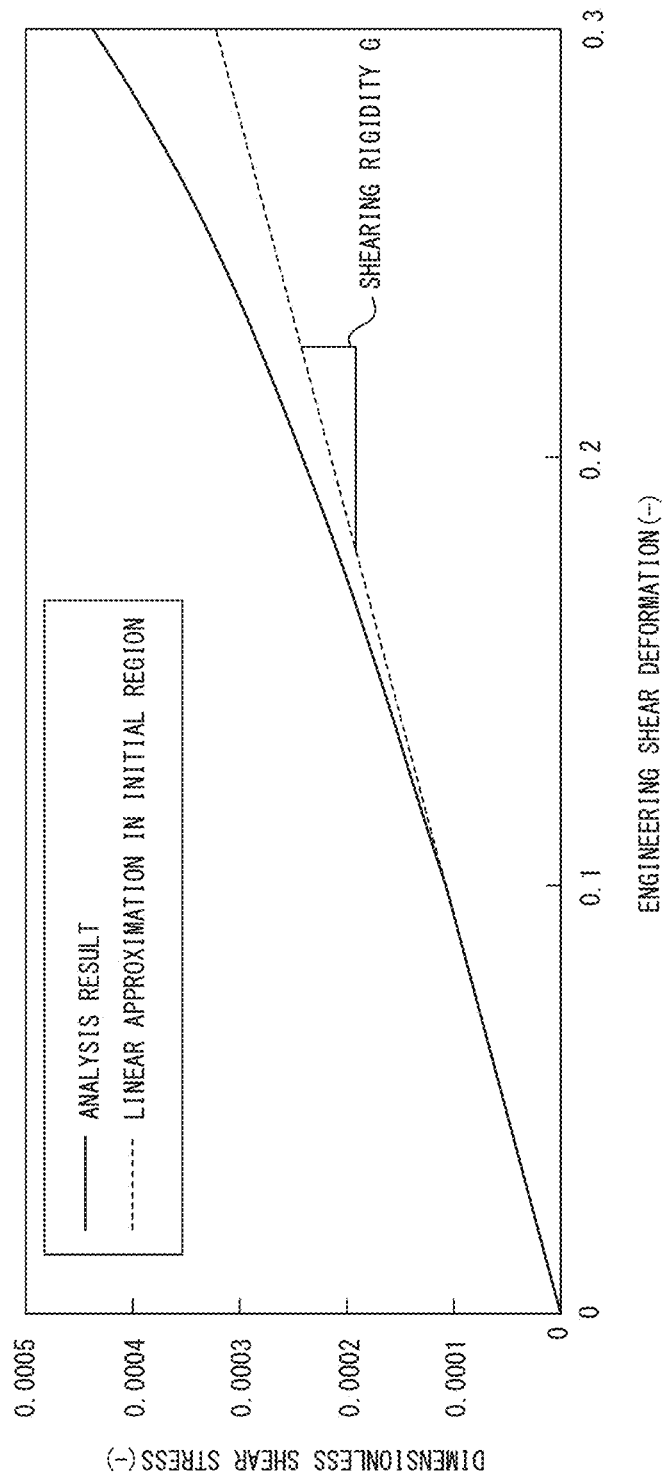
FIG. 13 is a drawing for description of definition of shearing rigidity G.

As illustrated in FIG. 13, the shearing rigidity G is defined as the gradient of an approximate straight line (dashed line) in an initial region of a graph illustrating the relation between dimensionless shear stress (the vertical axis) obtained by the Young's modulus of each bone part 2B and engineering shear deformation (the horizontal axis), the graph being obtained when deformation simulation in the shear direction was performed for a resin foamed body of each example.

Figure 14:
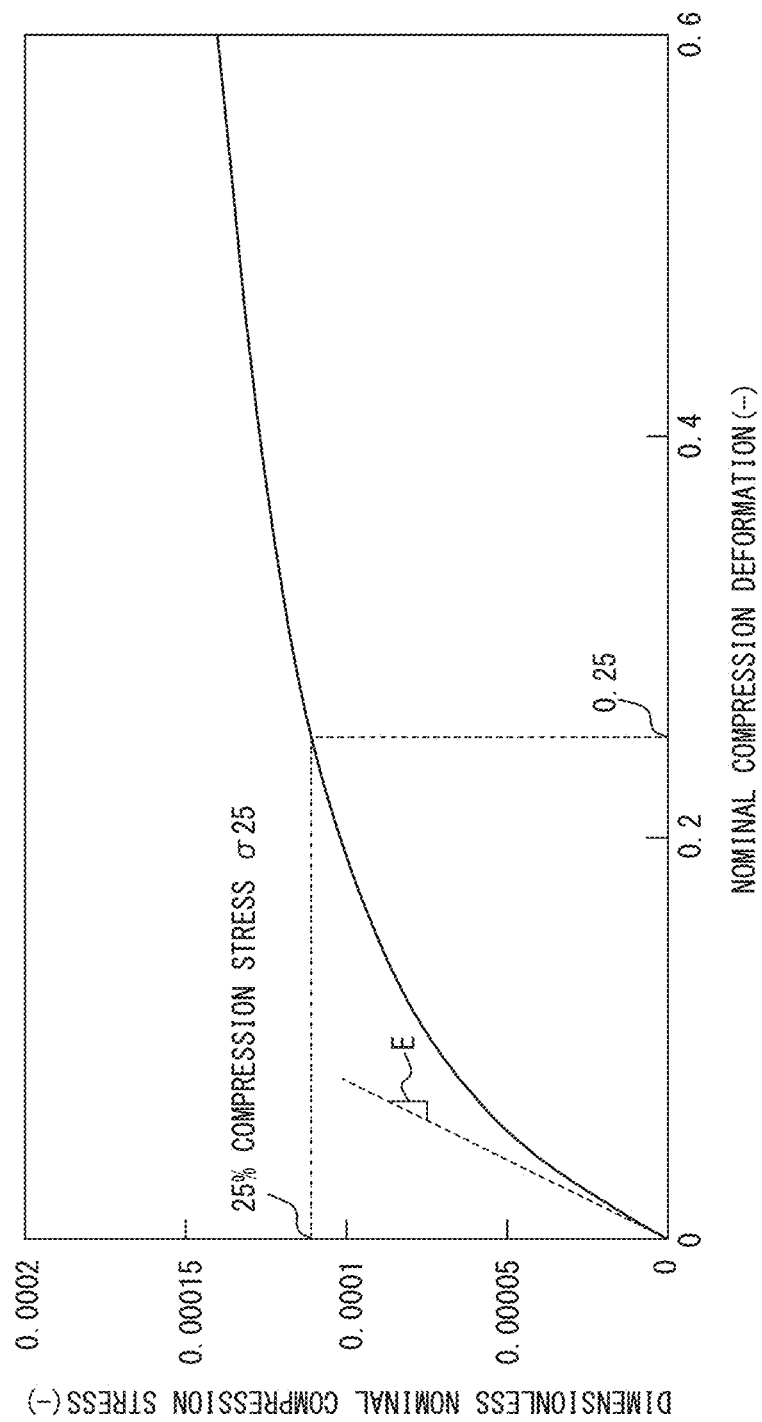
FIG. 14 is a drawing for description of definitions of 25% compression stress σ25 and a gradient E.

The 25% stress $\sigma 25$ can be regarded as the compression rigidity (25% hardness) of the resin foamed body, and as illustrated in FIG. 14, is defined as dimensionless nominal compression stress at nominal compression deformation of 0.25 (in other words, 25%) in a graph illustrating the relation between dimensionless nominal compression stress (the vertical axis) obtained by the Young's modulus of each bone part 2B and nominal compression deformation (the horizontal axis), the graph being obtained when deformation simulation in the compression direction was performed for the resin foamed body of each example.

As the value $G/\sigma 25$ is smaller, the ratio of the shearing rigidity relative to the compression rigidity is smaller, and thus the sense of touch is more excellent.

As illustrated in FIG. 10A, the sense of touch was significantly more excellent with Examples 1 and 2 than with Comparative Example 1. As illustrated in FIG. 10B, the sense of touch was more excellent with Examples 4 to 5 than with Example 3.

[Evaluation of Sense of Surface Touch]

In evaluation of the sense of surface touch, a value $E/\sigma 25$ obtained by dividing a gradient E by the 25% stress $\sigma 25$ was calculated for each of Comparative Example 1 and Examples 1 to 5. Results thereof are illustrated in FIGS. 11A and 11B.

As illustrated in FIG. 14, the gradient E is defined as the gradient of an approximate straight line (dashed line) in an initial region of a graph illustrating the relation between dimensionless nominal compression stress (the vertical axis) obtained by the Young's modulus of each bone part 2B and nominal compression deformation (the horizontal axis), the graph being obtained when deformation simulation in the compression direction was performed for the resin foamed body of each example.

As the value $E/\sigma 25$ is smaller, the sense of surface touch is more excellent.

Figure 11A:
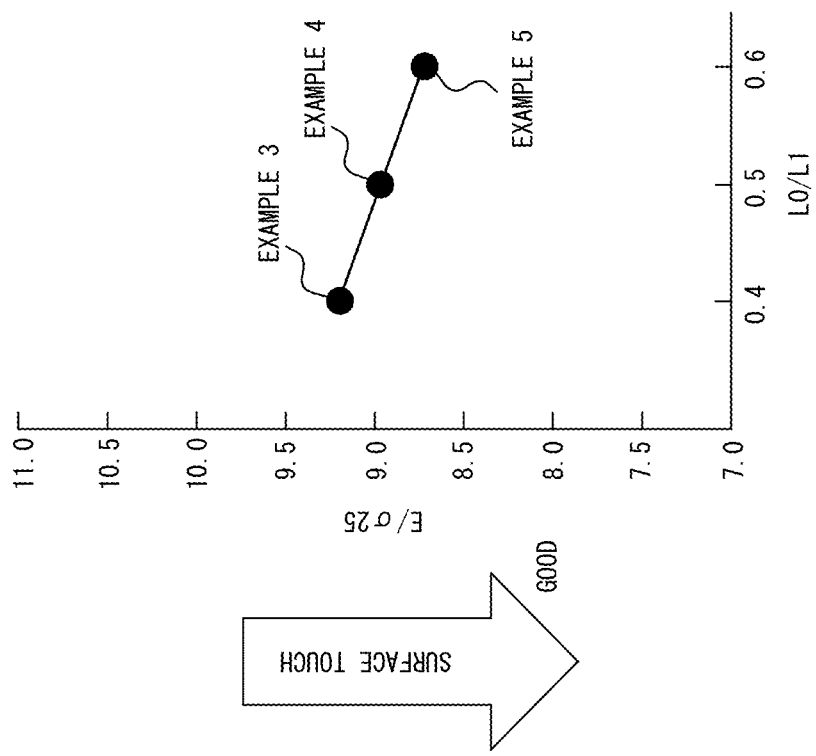
FIG. 11A is a drawing illustrating results of sense-of-surface-touch analysis performed for the resin foamed body according to Comparative Example 1 and Examples 1 and 2 of the present disclosure.
Figure 11B:
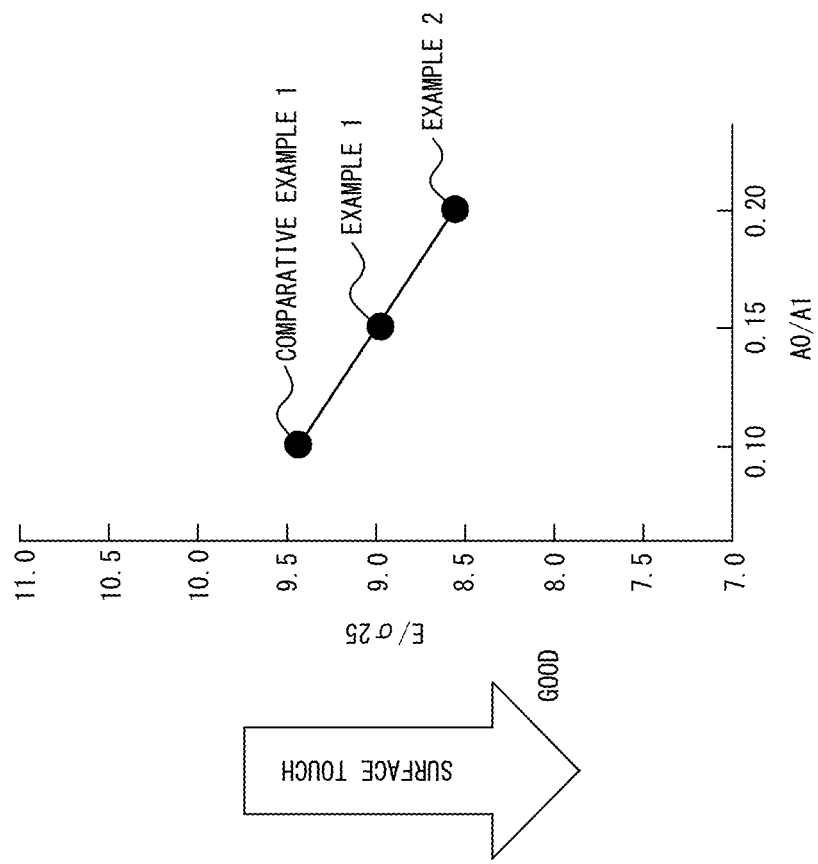
FIG. 11B is a drawing illustrating results of sense-of-surface-touch analysis performed for the resin foamed body according to Examples 3 to 5 of the present disclosure.
Figure 12:
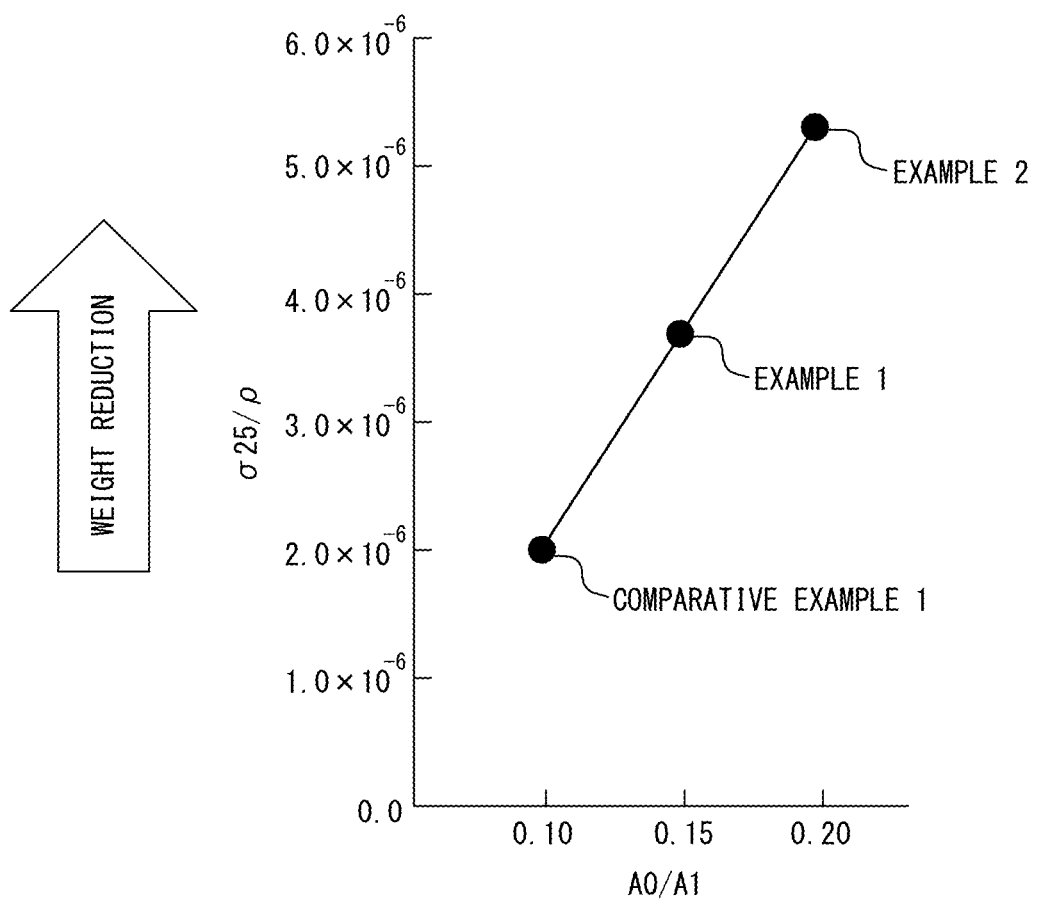
FIG. 12 is a drawing illustrating results of lightweight characteristic analysis performed for the resin foamed body according to Comparative Example 1 and Examples 1 and 2 of the present disclosure.

As illustrated in FIG. 11A, the sense of surface touch was more excellent with Examples 1 and 2 than with Comparative Example 1. As illustrated in FIG. 11B, the sense of surface touch was more excellent with Examples 4 to 5 than with Example 3.

[Evaluation of Lightweight Characteristic]

In evaluation of the lightweight characteristic, a value $\sigma 25/\rho$ obtained by dividing the 25% stress $\sigma 25$ by apparent density p was calculated for each of Comparative Example 1 and Examples 1 and 2. The value $\sigma 25/\rho$ indicates hardness achieved per unit density. Results thereof are illustrated in FIG. 12.

As the value σ25/ρ is larger, the rigidity is higher for weight, in other words, it is possible to achieve weight reduction while ensuring the same rigidity and thus the lightweight characteristic is more excellent.

As illustrated in FIG. 12, the lightweight characteristic was more excellent with Examples 1 and 2 than with Comparative Example 1.

INDUSTRIAL APPLICABILITY

The resin foamed body of the present disclosure is preferably used for a cushion member, more preferably used for, for example, a seating cushion member (such as a seat pad, particularly, a car seat pad) or a bed.

REFERENCE SIGNS LIST 1 resin foamed body
2 skeleton part
2B bone part
2Be end part of bone part
2B1 bone constant part
2B2 bone change part
2B21 edge of bone change part on connection part side
2B22 edge of bone change part on bone constant part side
2B23 tilted surface of bone change part
2J connection part
3 film
21 first cell defining part
211 first annular part
211L first large annular part
211S first small annular part
2111 inner periphery side edge part of first annular part
22 second cell defining part
222 second annular part
2221 inner periphery side edge part of second annular part
300 car seat pad
310 cushion pad
311 main pad
312 side pad
320 back pad
321 main pad
322 side pad
330 head rest
C cell hole
C1 first cell hole
C2 second cell hole
O skeleton line
U unit part of resin foamed body
V1 first virtual surface
V1L first large virtual surface
V1S first small virtual surface
V2 second virtual surface

The invention claimed is:

1. A resin foamed body made of flexible resin,
wherein the resin foamed body entirely includes a skeleton part,
the skeleton part includes
a plurality of bone parts, and
a plurality of connection parts connecting end parts of the plurality of bone parts,
the plurality of bone parts each include
a bone constant part extending while keeping cross-sectional area substantially constant, and
a bone change part extending from the bone constant part to the corresponding connection part while gradually increasing cross-sectional area, and
as for the plurality of bone parts, in each of the plurality of bone parts, an average value AV(A0/A1) of a ratio A0/A1 of cross-sectional area A0 of the bone change part of each bone part at an edge on the bone constant part side relative to cross-sectional area A1 of the bone change part at an edge on the connection part side satisfies $0.15 \leq AV(A0/A1) < 0.5$.

2. The resin foamed body according to claim 1, wherein as for the plurality of bone parts, in each of the plurality of bone parts, an average value AV(L0/L1) of a ratio L0/L1 of a length L0 of the bone constant part of each bone part relative to a length L1 of the bone part satisfies $0.5 \leq AV(L0/L1) < 1.0$.

3. The resin foamed body according to claim 2, wherein the resin foamed body is used for a seat pad.

4. The resin foamed body according to claim 1, wherein the resin foamed body is used for a seat pad.

* * * * *